(12) United States Patent
Frait et al.

(10) Patent No.: US 9,086,126 B2
(45) Date of Patent: Jul. 21, 2015

(54) MODULAR HYBRID TRANSMISSION

(75) Inventors: Steven Anatole Frait, Milan, MI (US); Steven Gerald Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/271,044

(22) Filed: Oct. 11, 2011

(65) Prior Publication Data
US 2013/0087425 A1    Apr. 11, 2013

(51) Int. Cl.
| | |
|---|---|
| *B60K 1/00* | (2006.01) |
| *B60K 6/20* | (2007.10) |
| *F16H 45/00* | (2006.01) |
| *B60K 6/387* | (2007.10) |
| *B60K 6/48* | (2007.10) |
| *B60K 6/26* | (2007.10) |
| *B60K 6/40* | (2007.10) |
| *B60L 11/14* | (2006.01) |
| *F16H 61/62* | (2006.01) |
| *H02K 7/00* | (2006.01) |

(Continued)

(52) U.S. Cl.
CPC *F16H 45/00* (2013.01); *B60K 6/26* (2013.01); *B60K 6/387* (2013.01); *B60K 6/40* (2013.01); *B60K 6/48* (2013.01); *B60L 11/14* (2013.01); *F16H 61/62* (2013.01); *H02K 7/006* (2013.01); *H02K 15/02* (2013.01); *B60K 2006/4825* (2013.01); *B60L 2270/145* (2013.01); *B60Y 2400/426* (2013.01); *F16H 57/0473* (2013.01); *F16H 2045/002* (2013.01); *Y02T 10/6221* (2013.01); *Y02T 10/6252* (2013.01); *Y02T 10/641* (2013.01); *Y02T 10/70* (2013.01); *Y02T 10/7077* (2013.01)

(58) Field of Classification Search
CPC .... B60W 20/00; B60W 10/08; B60K 17/046; B60K 1/00; B60K 6/20
USPC ............... 180/65.51, 65.2, 65.21, 65.31, 65.6
See application file for complete search history.

(56) References Cited

U.S. PATENT DOCUMENTS

| | | | | |
|---|---|---|---|---|
| 5,427,196 A | * | 6/1995 | Yamaguchi et al. | ....... 180/65.21 |
| 6,208,036 B1 | * | 3/2001 | Evans et al. | ................ 180/65.31 |
| 6,581,705 B2 | | 6/2003 | Phillips et al. | |

(Continued)

FOREIGN PATENT DOCUMENTS

WO    2008025691 A1    3/2008

OTHER PUBLICATIONS

Kazuhiro Takatori et al.; "Development of All New 7-speed Automatic Transmission for RWD Vehicles"; SAE International publication, 2009-01-0512; 2009; 8 pages, USA.

(Continued)

*Primary Examiner* — Hau Phan
(74) *Attorney, Agent, or Firm* — David B. Kelley; Brooks Kushman P.C.

(57) ABSTRACT

The disconnect clutch and motor of a parallel type hybrid electric vehicle are repositioned within the wet zone of an automatic transmission to compactly and efficiently reconfigure a drive line using a motor and transmission assembly. A drive shell is provided interposed between the engine output and the disconnect clutch input which surrounds the torque converter enabling the torque converter to move independent to the engine output shaft. The resulting structure is compact and provides good structural support and cooling for the disconnect clutch and motor.

19 Claims, 7 Drawing Sheets

(51) Int. Cl.
  *H02K 15/02* (2006.01)
  *F16H 57/04* (2010.01)

(56) References Cited

U.S. PATENT DOCUMENTS

| | | | |
|---|---|---|---|
| 6,777,837 B2 * | 8/2004 | Tsuzuki et al. | 310/67 R |
| 7,002,267 B2 * | 2/2006 | Raszkowski et al. | 310/54 |
| 7,114,604 B2 | 10/2006 | Masuya | |
| 7,234,577 B2 * | 6/2007 | Masuya | 192/3.29 |
| 7,247,112 B2 * | 7/2007 | Foster et al. | 475/5 |
| 7,268,451 B2 * | 9/2007 | Hertz et al. | 310/68 B |
| 7,284,313 B2 * | 10/2007 | Raszkowski et al. | 29/596 |
| 7,370,715 B2 | 5/2008 | Colvin et al. | |
| 7,509,802 B2 * | 3/2009 | Hammond et al. | 60/330 |
| 7,810,622 B2 * | 10/2010 | Foster et al. | 192/48.619 |
| 8,137,229 B2 * | 3/2012 | Kempf et al. | 475/149 |
| 8,272,464 B2 * | 9/2012 | Reinhart et al. | 180/65.51 |
| 2005/0037883 A1 * | 2/2005 | Motoike et al. | 475/5 |
| 2005/0205380 A1 * | 9/2005 | Raszkowski | 192/106 F |
| 2008/0093135 A1 * | 4/2008 | Nomura et al. | 180/65.2 |
| 2010/0087290 A1 | 4/2010 | Schoenek et al. | |
| 2011/0118079 A1 | 5/2011 | Mueller et al. | |
| 2011/0118915 A1 | 5/2011 | Ortmann et al. | |

OTHER PUBLICATIONS

Koichi Hayasaki et al.; "Development of a Parallel Hybrid System for RWD Vehicles"; SAE International publication, 2011-01-0884; Apr. 12, 2011; 17 pages, USA.

Kenji Arai et al.; "High Power Density Motor and Inverter for RWD Hybrid Vehicles"; SAE International publication, 2011-01-0351; Apr. 12, 2011; 11 pages, USA.

* cited by examiner

CLUTCH APPLICATION SCHEDULE

| Gear | Clutch A | Clutch B | Clutch C | Clutch D | Clutch E | Ratio |
|------|----------|----------|----------|----------|----------|-------|
| 1st  | X        |          |          | X        |          | 4.17  |
| 2nd  | X        | X        |          |          |          | 2.34  |
| 3rd  | X        |          | X        |          |          | 1.52  |
| 4th  | X        |          |          |          | X        | 1.14  |
| 5th  |          | X        |          |          | X        | 0.87  |
| 6th  |          |          | X        |          | X        | 0.69  |
| Rev  |          | X        |          | X        |          | -3.40 |

MODULAR HYBRID TRANSMISSION

TECHNICAL FIELD

This invention relates to hybrid electrical vehicles and motor/transmission assemblies used therein.

BACKGROUND

Hybrid electric vehicles (HEVs) have both an internal combustion engine and an electric motor which can alternately or in combination be used to propel the vehicle. A variety of different drive trains are used in hybrid vehicles. The present application relates to a parallel configuration in which the engine is connected to the motor by a disconnect clutch with the motor driving the torque converter input of an automatic hydraulic transmission. The hydraulic transmission has an output which is connected to a differential coupled to the two driven wheels of the vehicle. This parallel hybrid electric vehicle drive chain power flow arrangement is known in the art.

A problem facing HEV designers is how to cool the disconnect clutch and the rotor and stator portions of the electric motor. Various air and liquid based cooling systems have been proposed; however, most systems are costly and pose packaging problems when trying to convert a non-hybrid vehicle to a hybrid operation. A need exists to package the disconnect clutch, motor, torque converter and automatic transmission in a compact manner so that a conventional vehicle can be reconfigured as a hybrid at a relatively low cost and with little or no vehicle body modifications.

SUMMARY

The present invention relates to a novel hybrid electric vehicle as well as a number of novel components and sub-components specifically adapted to reorient the disconnect clutch and the electric motor within the wet side of the automatic transmission. This is done without changing the conventional power flow in which the engine, disconnect clutch, motor, torque converter, transmission are connected in series.

Rather than connect the torque converter directly to the engine as is typically done in a non-hybrid vehicle, a drive shell is provided which connects the engine to the input side of the disconnect clutch which is has been relocated into the automatic transmission housing. The drive shell forms an annular cavity of sufficient size to contain the torque converter freely therein. The motor is also located in the automatic transmission wet zone preferably circumaxially surrounding the disconnect clutch. The rotor of the motor is connected to the disconnect clutch output. The disconnect clutch output and the rotor are both coupled to the rotor shaft which is connected to input turbine of the torque converter. The torque converter stator and the output turbine are connected to a tubular stator shaft and a transmission input shaft respectively. The transmission input shaft, the stator shaft, the rotor shaft and the disconnect clutch hub are all concentric with one another and accessible through an annular opening in the front side of the automatic transmission housing.

The torque converter and the drive shell are removably mountable on the front of the transmission housing similar to a conventional torque converter. Rather than attaching the torque converter to the engine mounting plate, a drive shell is attached to the mounting plate. The torque converter is free to rotate relative to the drive shell within the drive shell cavity, resulting in a compact and axially short motor/transmission assembly. By locating the disconnect clutch and motor coaxially in the front portion of the wet zone of the automatic transmission, the transmission hydraulic fluid pump, associated pump and plumbing system can cool the disconnect clutch and the rotor and stator portions of the electric motor with relatively little increase in axial length.

The torque converter, while generally similar to a conventional torque converter, is uniquely adapted in order to practice the invention. Since the torque converter is not attached to the engine mounting plate, no mounting studs are provided on the shell of the torque converter. Rather, a central axially bearing member is provided which cooperates with an engine mounting plate provided with a corresponding bearing member in order to radially support the torque converter and limit axially movement in the forward direction. Within the torque converter is a rearward facing thrust bearing member which cooperates with the free end of the transmission input shaft to limit the axial movement of the torque converter in the rearward direction.

The transmission housing is preferably also uniquely adapted in order to practice the present invention. The transmission housing includes a wet housing which partially defines an enclosed wet zone and a torque converter housing, adapted to be affixed to the wet housing on one side and to the engine block on the other. The torque converter housing has a rear wall which forms a boundary between the wet cavity and the dry cavity in which the torque converter and drive shell are oriented. The rear wall defines an annular bore which cooperates with the disconnect clutch input hub to support the input hub and the rotor shaft along with the associated rotor portion of the motor and the disconnect clutch output hub.

BRIEF DESCRIPTION OF THE DRAWINGS

FIG. 4b is a stick diagram of the motor/transmission assembly of FIG. 4a;

DETAILED DESCRIPTION

Figure 1:
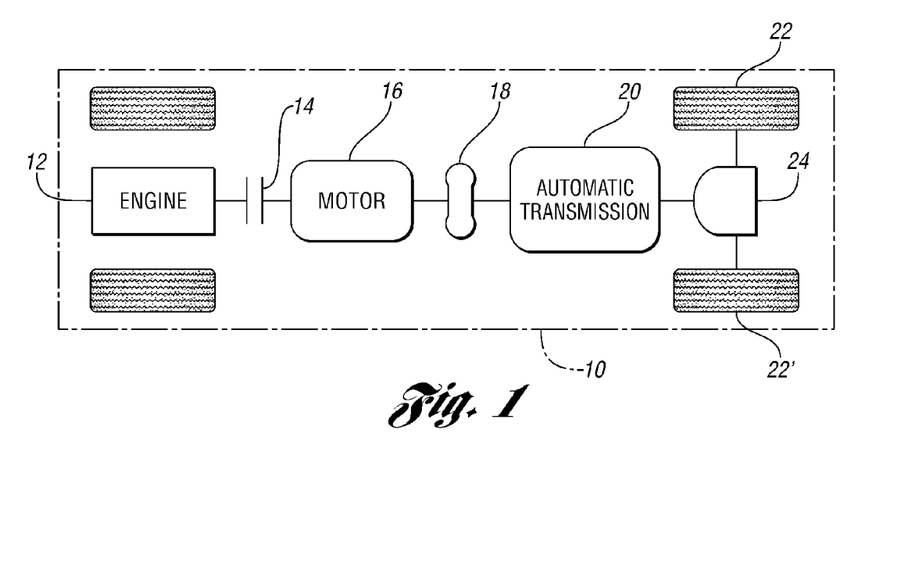
FIG. 1 is a schematic illustration of a hybrid electric vehicle having a parallel-flow design.

FIG. 1 illustrates a hybrid electric vehicle 10 schematically shown with a parallel type hybrid electric drive train. The hybrid electric vehicle is provided with an engine 12 having a rotary output which is connected to a disconnect clutch 14 which drives an electric motor 16. The output of the electric motor is connected to the input of torque converter 18, the output of which is connected to the input shaft of automatic transmission 20. In a conventional manner, the automatic transmission is connected to the driven wheels, 22, 22' by a differential 24. In the schematic illustration, hybrid electric vehicle 10 is provided with a pair of non-driven wheels, however, alternatively, a transfer case and a second differential can be utilized in order to positively drive all of the vehicle's wheels. The engine, disconnect clutch, motor, torque converter and the automatic transmission are connected sequentially in series, as illustrated in FIG. 1.

Figure 2:
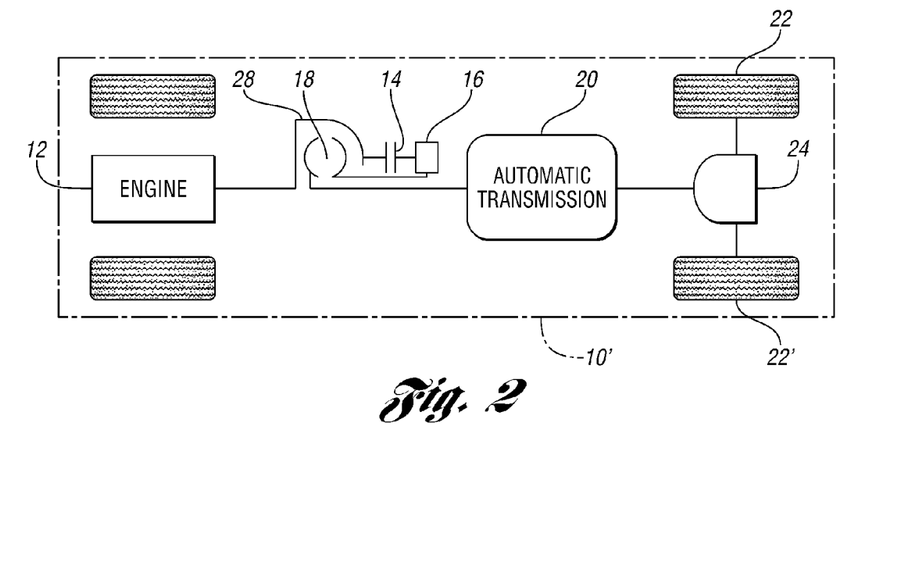
FIG. 2 is a simplified schematic illustration of the disconnect clutch and motor reoriented in the present invention.

Motor/transmission assembly 26, in hybrid electric vehicle 10', schematically illustrated in FIG. 2, repackages the drive components while maintaining the same power flow, as shown in FIG. 1. Engine 12 is mechanically connected to the input side above disconnect clutch 14 via a drive shell 28 which forms an annular chamber sufficiently large to extend about torque converter 18. The output of disconnect clutch 14 is connected to electric motor 16 which, in turn, is connected to the Impeller "I" of torque converter 18. The use of the drive shell 28 enables the disconnect clutch and motor to be positioned within the wet side of the automatic transmission housing. Turbine "T" is attached to the output of torque converter 18 which is connected to the input shaft of the automatic transmission in a conventional manner. The invention can be practiced with a wide variety of automatic transmissions. The preferred embodiment of the transmissions described herein is a six-speed, three planetary gear set, five clutch design; alternative transmission structures having fewer or greater speeds and different mechanical configurations can likewise be benefited from the present invention.

Figure 3:
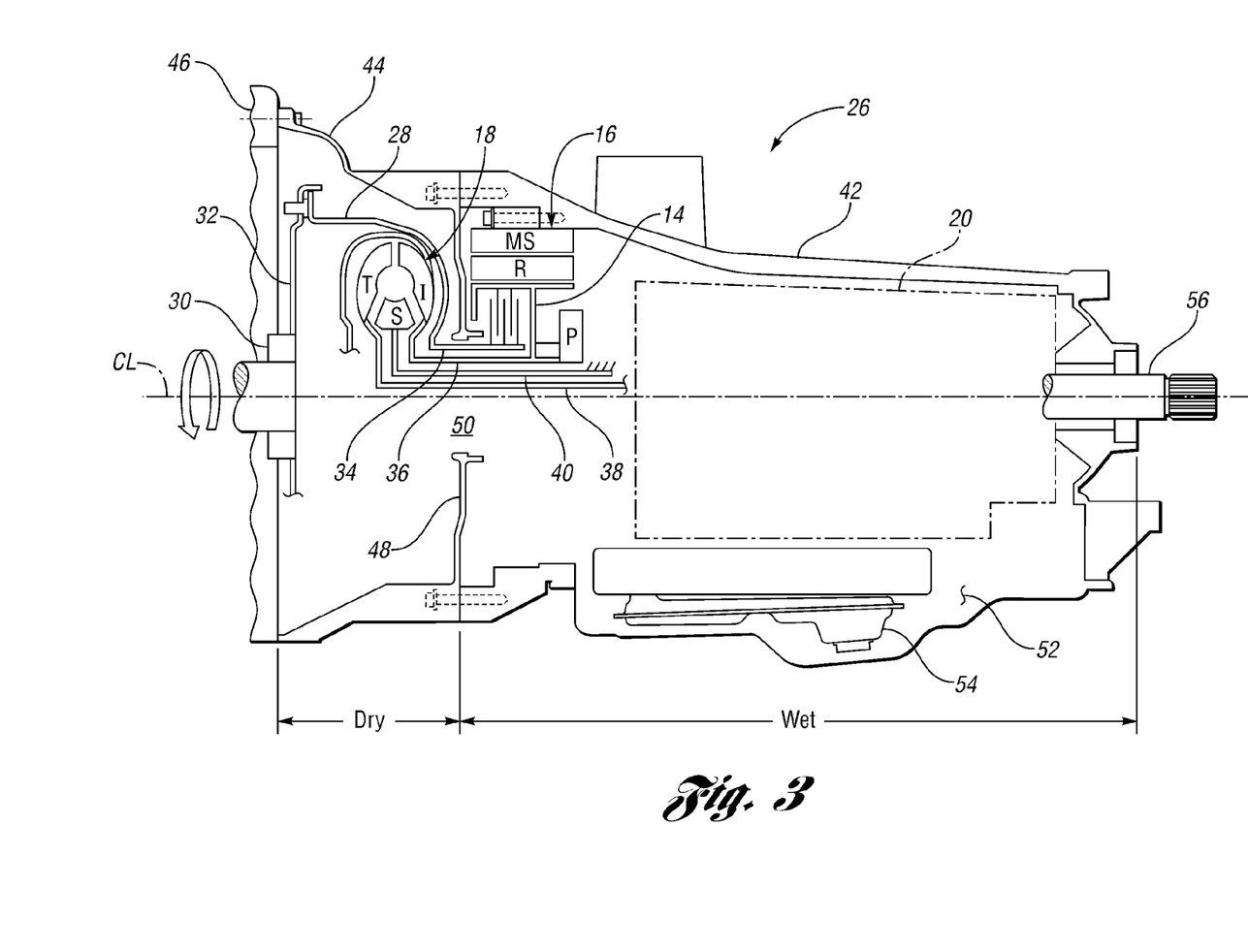
FIG. 3 is a simplified cross-sectional view of an automatic motor/transmission assembly of the present invention.

A more detailed, yet quite simplified illustration of the motor/transmission assembly 26 is shown in FIG. 3. The engine is provided with a crank shaft output flange 30 which is bolted to mounting plate 32 in a conventional manner. The mounting plate 32, rather attaching to the shell of the torque converter, is affixed to the drive shell 28 which has sufficient diameter to encircle the torque converter and connect to the input hub 34 of disconnect clutch 14. The output of the disconnect clutch is affixed to the rotor "R" portion of motor 16 and in turn, is connected to rotor shaft 36. The rotor shaft 36 is coaxially nested within the disconnect clutch input hub 34 and extends to an annular opening in the wall portion of the transmission housing defining the wet zone of the transmission. Rotor shaft 36 is connected to the impeller "I" of torque converter 18, which in turn drives turbine T connected to transmission input shaft 38. Coaxially spaced between the inside diameter of rotor shaft 36 and the periphery of the transmission input shaft 38 is a stator shaft 40 which is fixed relative to the transmission housing and supports stator element S located within torque converter 18.

Preferably, the case of the motor/transmission assembly is made up of a wet housing 42 which partially defines the enclosed wet zone cavity, and a torque converter housing 44 which is adapted to be affixed to the wet housing 42 and to the engine block 46. The torque converter housing 44 is preferably provided with rear wall 48 having an annular axial opening 50 on the transmission centerline. Rear wall 48 forms a physical boundary between the wet zone cavity and a dry cavity in the transmission housing. The torque converter 18 and drive shell 28 are located in the dry zone as shown. Rear wall 48 cooperates with disconnect clutch input hub 34 which in turn supports motor rotor shaft 36 and the associated rotor portion R of motor 16.

The motor/transmission assembly is provided with pump P for hydraulic fluid oriented within the wet zone of the transmission housing and driven by the rotor shaft 36. Pump P provides pressurized hydraulic fluid to operate the clutches and brakes within the transmission drive train as well as operating the disconnect clutch and provides cooling for the clutches and motor 16.

Figure 4A:
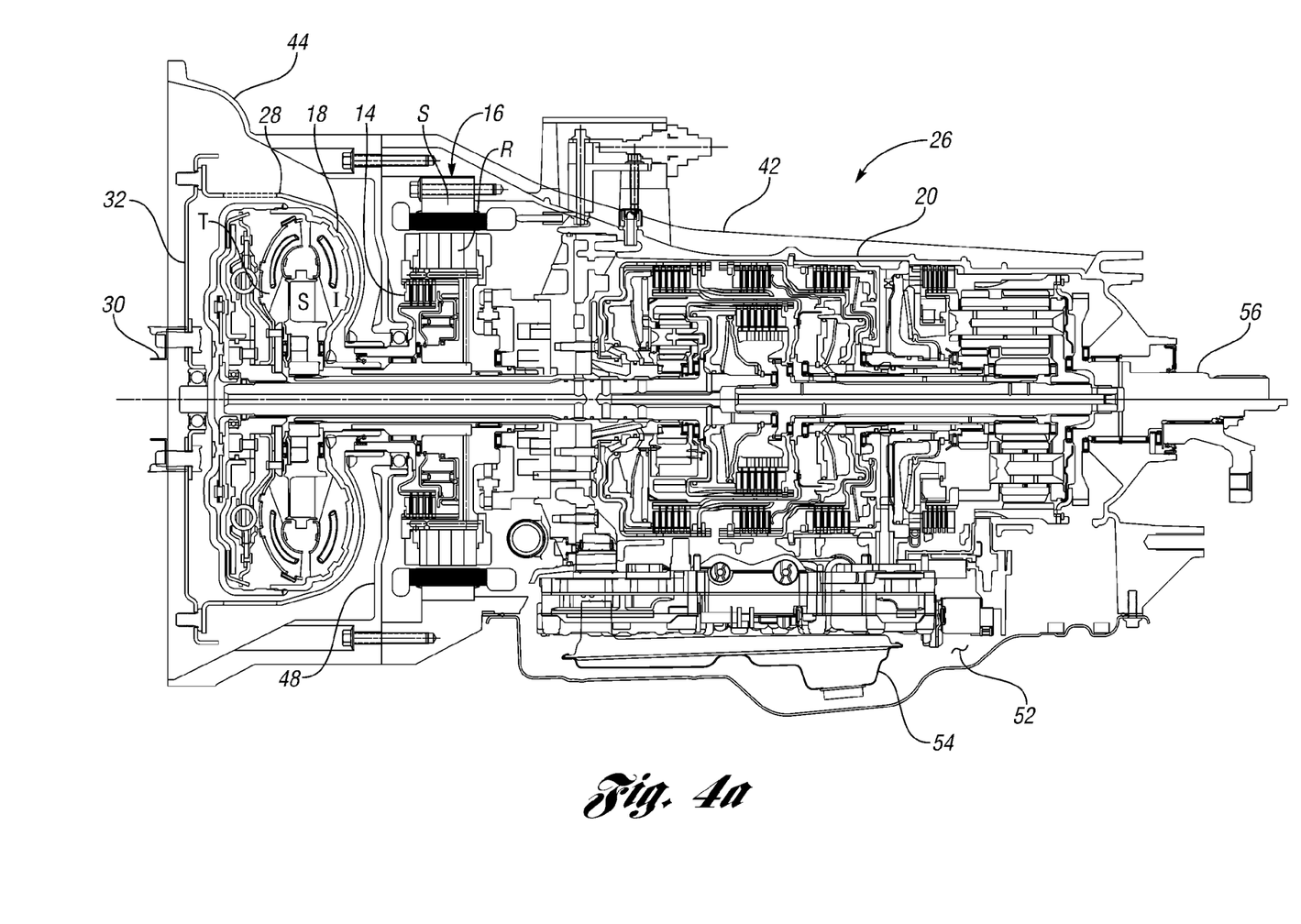
FIG. 4a is a more detailed cross-sectional side elevational view of an automatic motor / transmission assembly of the present invention.

Similarly, the disconnect clutch and motor share a common sump 52 for transmission fluid as well as a common pump screen 54. Automatic transmission 20 is provided with an output shaft 56. FIG. 4a is a cross-sectional side elevational view of the motor/transmission assembly 26. One again, the present invention can be utilized with a number of different transmission gear train configurations and is not limited to the disclosed six-speed, three planetary gear set transmission.

Figure 4B:
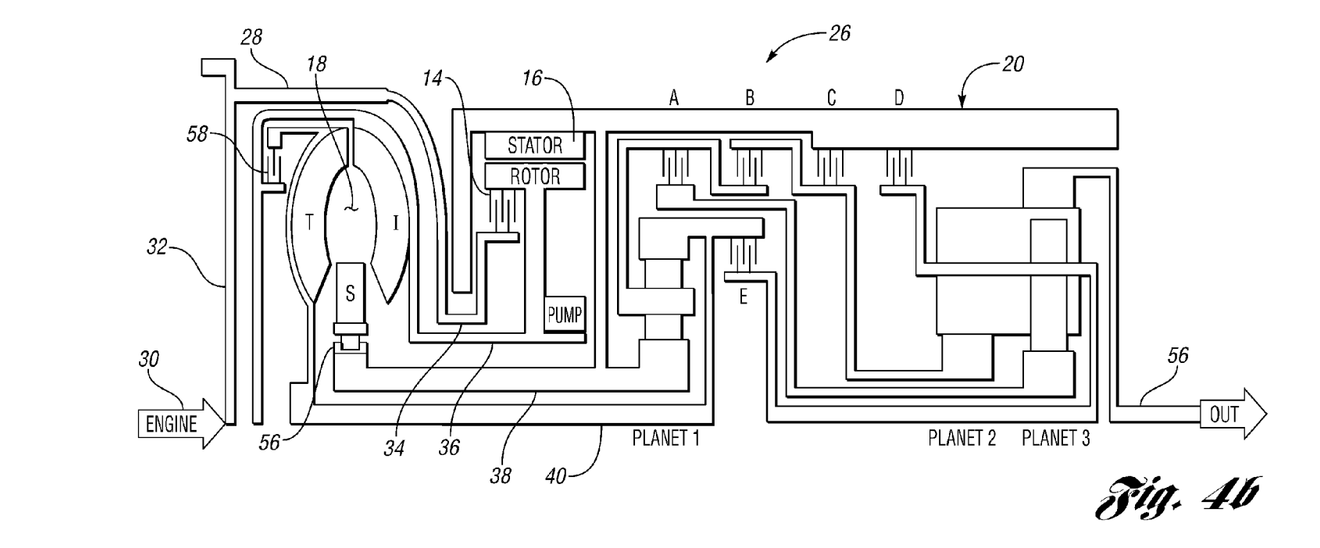

The preferred embodiment of the multi-speed transmission shown in FIG. 4a is more easily understood with reference to the stick diagram of FIG. 4b. The input from the engine drives mounting plate 32 which is fastened to drive shell 28 connected to input hub 34 of disconnect clutch 14. The output side of disconnect clutch 14 is connected to the rotor portion of motor 16, which in turn is attached to rotor shaft 36. Coaxially oriented within rotor shaft 36 is a fixed stator shaft 40 which is mounted to the transmission case, and the transmission input shaft 38. The torque converter impeller I drives torque converter turbine T which is connected to transmission input shaft 38. The torque converter 18 is further provided with a stator S mounted on the stator shaft 40, by way of a one-way clutch. In the preferred embodiment illustrated, torque converter 18 is further provided lock up clutch 58 which locks the turbine to the impeller in a well known manner.

Figure 4C:
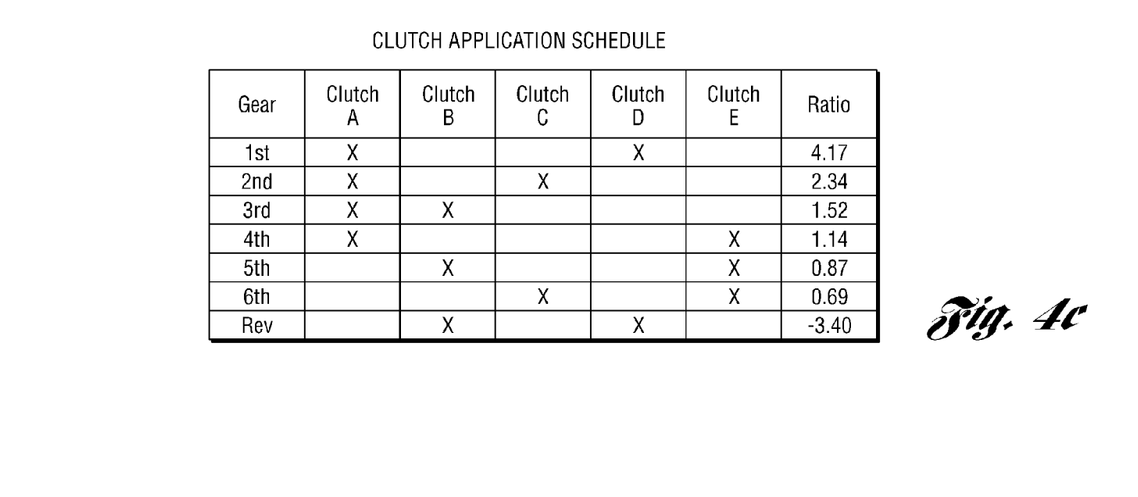
FIG. 4c is a clutch application schedule for each of the six forward gears and reverse.

The gear set of the planetary automatic transmission 20 is made up of three planetary stages; plan 1, plan 2 and plan 3, which are coaxially aligned and axially spaced as shown. Each planetary gear set has a sun, a ring and a series of plant gears supported on a planet carrier. The sun, ring and planet carrier members can be interconnected via a series of five clutches and brakes. For example, in first gear, clutch A and brake D are engaged as illustrated in clutch application table in FIG. 4c. The transmission input shaft 38 is connected to the ring of planetary gear set Plan 1. The sun is fixed and the planet carrier is connected via clutch A to the sun of planetary gear set 3. With clutch D engaged, the planet carrier of planetary gear set 3 is fixed causing the ring gear of planetary gear set 3 to drive the transmission output shaft 56. In order to shift to the second gear, brake D is released and brake C is simultaneously engaged to cause a change in the transmission gear ratio. Each shift, either up or down, is achieved by releasing one clutch or brake and engaging another. Similarly, the shift from first reverse is done by a single clutch release, a simultaneous engagement of another clutch.

Planetary gear sets 2 and 3 share a common planet element as well as a common ring gear. Planetary gear sets 1 and 2 are traditional, simple planetary gear sets, while planetary gear set 3 is a compound planetary gear set having a pair of intermeshed planets, one engaging the sun and one engaging the ring. In the embodiment illustrated in FIG. 4b, the compound planet arrangement enables the third planetary gear set to use a smaller sun and accordingly, obtain a higher gear reduction ratio. Again, the planetary gear set is described merely to illustrate the preferred embodiment, however, the invention can be practiced with a wide variety of automatic transmission structures.

Figure 5:
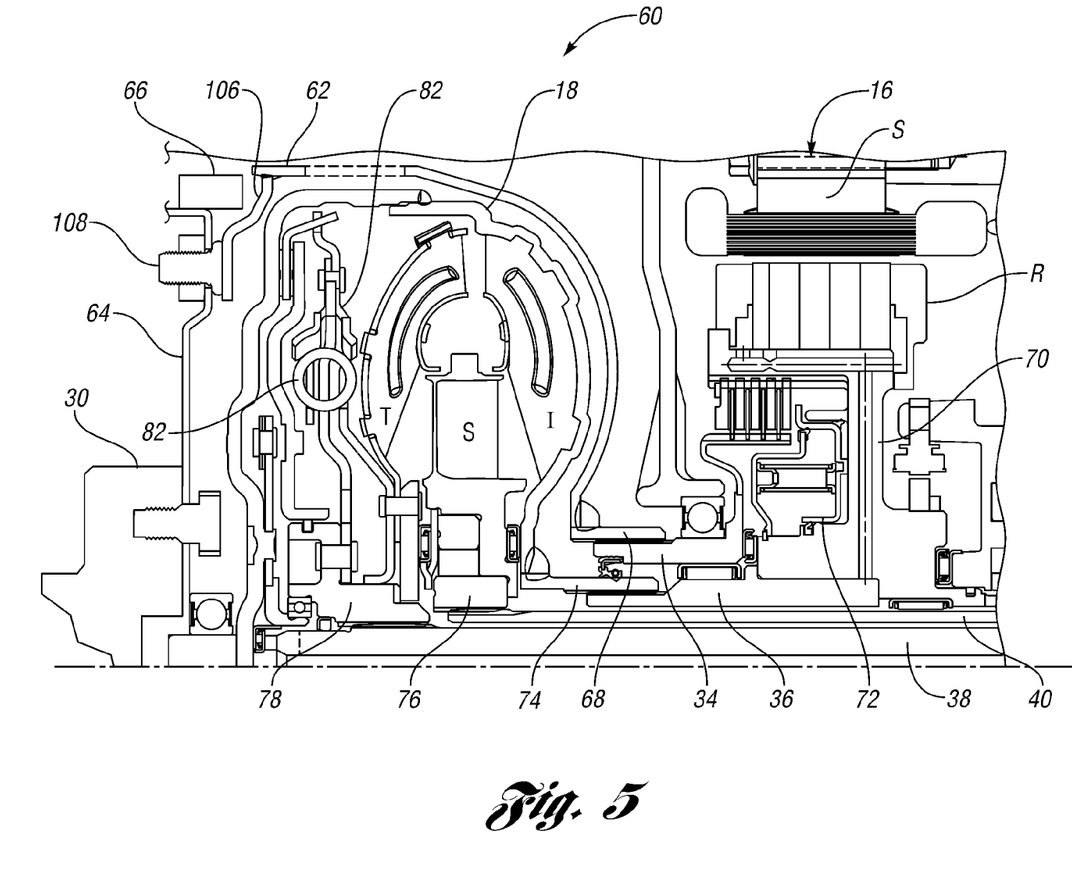
FIG. 5 is an enlarged view of the cross-section of the torque converter in its cooperation with the disconnect clutch and motor.

FIG. 5 is a cross-sectional view illustrating an alternative drive shell arrangement 62 which is designed to accommodate a smaller diameter mounting plate 64. Output flange 30 of the engine crank shaft is attached to mounting plate 64 by a series of bolts extending through an array of holes in the mounting plate spaced from the mounting plate center. The outer peripheral edge of mounting plate 64 is provided with a ring gear 66 for cooperation with the pinion gear of the starter motor. Inboard of the periphery of the mounting plate is a series of holes sized to receive threaded fasteners for connecting the drive shell 62 to the mounting plate. In the embodiment illustrated, the drive shell is provided with threaded studs which project through an array of holes in the mounting plate to receive nuts to securely affix the drive shell to the mounting plate. Nuts alternatively could be welded to the mounting plate to receive bolts passing through the apertures in the mounting plate. The mounting plate alternatively may also include a dual mass damper (not shown) in order to reduce torque fluctuations.

Unlike a conventional automatic transmission vehicle, the torque converter 18 is not bolted to the engine mounting plate, rather it is free to rotate within the annular cavity defined by the drive shell mounting plate. The rearward end of the drive shell forms a tubular drive shell outlet member 68 which is connected to disconnect clutch input hub 34. Rearward refers to the direction toward the transmission output shaft 56 which would be to the rear of a vehicle in a traditional rear wheel drive front engine vehicle, however, the terms, "rearward" and "forward" are used for simplicity and explanation purposes. They do not necessarily refer to the front and rear of the vehicle as would not be the case if installed transversely in a front wheel drive vehicle. The forward side of the torque converter 18 is free of studs typically used to attach to the mounting plate.

Preferably, the drive shell tubular output hub 68 is provided with an internal spline to axially cooperate with a complimentary external spline on disconnect clutch input hub 34. Disconnect clutch 14 has a series of inter-leaved plates alternatively connected to the input hub 34 and output hub 70. A disconnect hub ring shape piston 72 cooperates within a corresponding cavity formed in the disconnect clutch output hub and is axially shiftable between an extended locked position when the hydraulic signal advancing the disconnect clutch piston 72 is received, and a retracted position when the signal is not present. Affixed to the outer periphery of the disconnect clutch output hub 70 is the rotor R. Disconnect clutch output hub 70 and rotor R are both mounted on rotor shaft 36. Rotor shaft 36 is provided with external spline sized to cooperate with a complimentary internal spline on the torque converter input hub 74 which drives impeller I. Torque converter 18 is further provided with a stator S mounted on a stator hub 76 and an output turbine which is connected to turbine output hub 78 via a torsional damper 82 illustrated in FIG. 5. Turbine output hub 78 is provided with an internal spline cooperating with transmission input shaft 38. Stator hub 76 is mounted on stator shaft 40 which is affixed to and extends out of the transmission housing. In the embodiment illustrated, the stator is mounted on a one-way clutch center in a conventional manner.

Figure 6:
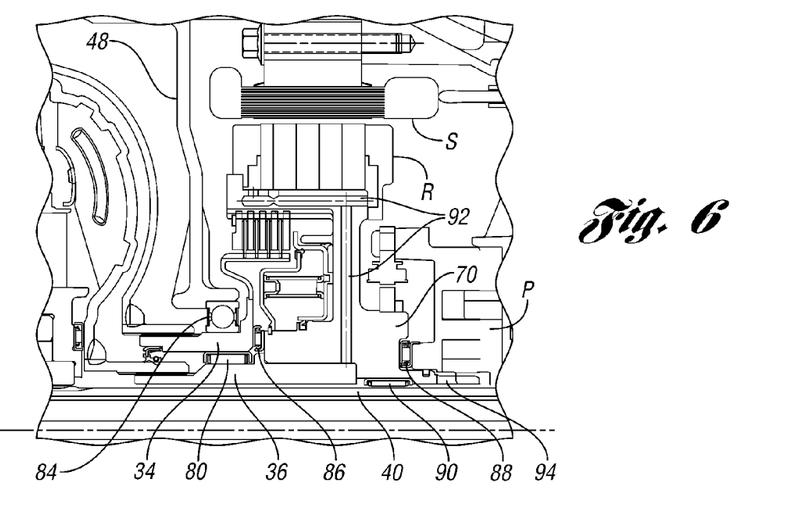
FIG. 6 is an enlarged view of the disconnect clutch and electric motor.

The torque converter 18 and drive shell 62 together, mate with the four different coaxial aligned members in the transmission and slide on and off during installation like a conventional torque converter in an automatic transmission, simply having one additional coaxial members, the tubular output 68 of the drive shell 62. Accordingly, the use of the drive shell takes very little additional axial space in the motor/transmission assembly. The addition of the disconnect clutch 14 and motor 16 to the transmission, however, does take some additional axial space inside of the transmission housing. As shown in FIG. 6, the motor and disconnect clutch are oriented coaxially with the disconnect clutch mounted inside of motor rotor R. Motor stator S is securely affixed to the transmission housing by a series of annularly spaced apart bolts which extend through the stator laminate stack. The motor rotor R is mounted to the outer periphery of the disconnect clutch output hub 70 supported on rotor shaft 36.

The rotor shaft 36 is radially located by a roller bearing 80 interposed between the rotor shaft 36 and disconnect input clutch hub 34. The outside diameter of the disconnect clutch input hub is supported upon a wall 48 in the transmission housing by way of a bearing 84. Bearing 84 is designed to take an axial load as well as the radially load inserted by the rotor disconnect clutch output hub assembly. A disconnect clutch output hub 70 is further axially constrained by thrust bearings 86 and 88. Additionally, a circumaxial roller bearing 90 is interposed between the disconnect clutch output hub 70 and stator shaft 40 to axially locate rotor shaft 36 and the associated disconnect clutch and rotor.

The disconnect clutch output hub 70 is provided with internal coolant passageways 92 which feed transmission fluid through the disconnect clutch output hub into the rotor R. As fluid passes through and exits the rotating rotor R, it strikes the windings of stator S to remove excess heat from stator windings and the associated stator laminate stack. As illustrated in FIG. 6, disconnect clutch output hub 70 is also provided with an output spline 94 for driving pump P.

Figure 7:
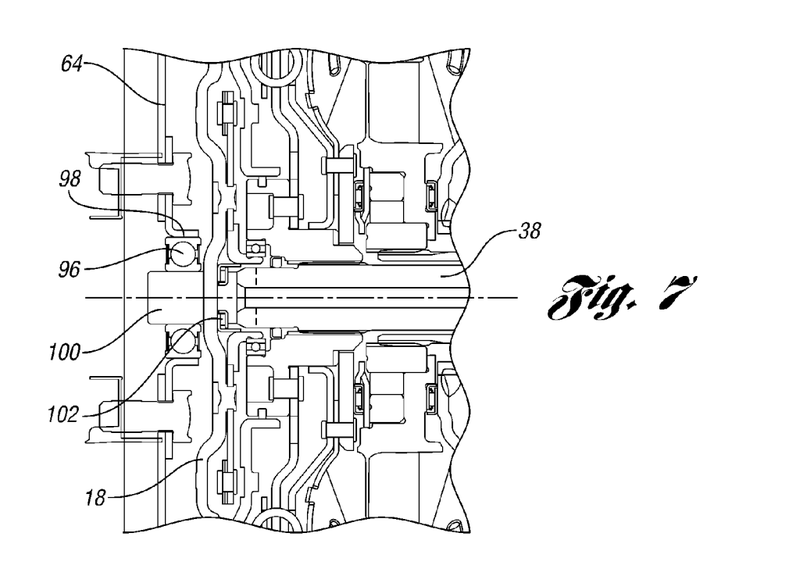
FIG. 7 is an enlarged view of the engine output on the mounting plate torque converter and the transmission input shaft showing their axial orientation.

Since the torque converter 18 is no longer affixed to the engine mounting plate, it is necessary to axially and radially constrain the torque converter. The torque converter 18 is pivotally supported on the engine mounting plates 32 and 64 in FIGS. 3 and 5. The engine mounting plates are provided with an axially mounted first bearing member which cooperates with a mating second bearing member on the torque converter. As illustrated in FIG. 7, the first bearing member in the preferred embodiment is provided by a roller bearing 96 supported in a bearing cup 98 affixed to the mounting plate on the transmission centerline. The corresponding second bearing member is provided by a stub shaft 100 which is affixed to the shell of torque converter 18. The stub shaft provides radial support for the torque converter while bearing 96 further provides an axial stop for the torque converter in the forward direction. To limit rearward movement of the torque converter, the torque converter is provided with a thrust bearing 102 on the axial center line of the shell interior facing rearward for engaging the end region of the transmission input shaft 38. Of course, alternative structures can be utilized such as placing the stub shaft on the mounting plate and the roller bearing on the torque converter shell.

Figure 8:
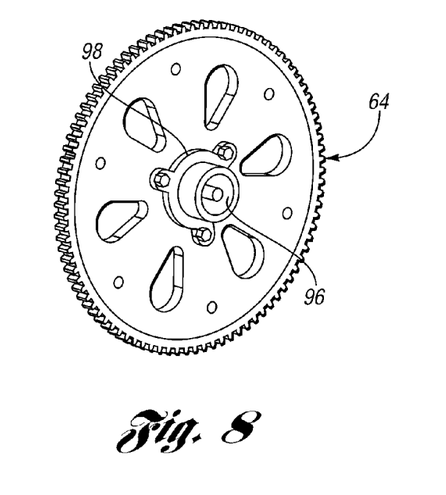
FIG. 8 is a perspective view of a mounting plate used to practice the present invention.

The motor/transmission assembly 26, as previously described, uses a number of subcomponents which are independently novel. FIG. 8 is a perspective view of the mounting plate 64 formed of a circular disc provided with a centrally axially aligned first bearing member, roller bearing 96, mounted in bearing cup 98. The disc is provided with two circular arrays of mounting holes, an array adjacent the center to attach to the crankshaft of the engine and an array adjacent the periphery to attach to the drive shell 28.

Figure 9:
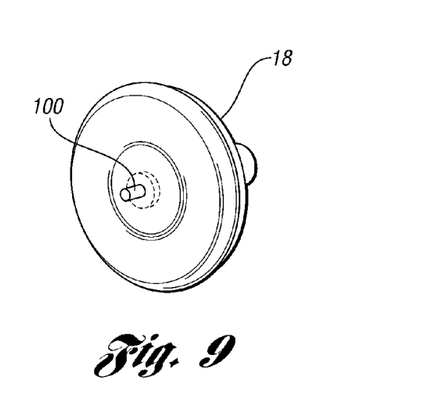
FIG. 9 is a perspective view of a torque converter used to practice the present invention.

Torque converter 18, illustrated in FIG. 9, is similarly novel. The torque converter outer shell is not provided with the conventional mounting studs, rather it is provided with a central axial second bearing member, which in this case is provided by a stub shaft 100. Other axial central bearing members could alternatively be used provided that they cooperate with a corresponding bearing structure on the mounting plate to bear radial loads and provide a positive forward stop for torque converter movement. The torque converter has an annular rearward facing tubular outlet hub 68 which connects to rotor shaft 36, and a rearward facing thrust bearing 102 on the centerline inside of the shell as show in FIG. 7 to abut the end of transmission input shaft 38.

Figure 10:
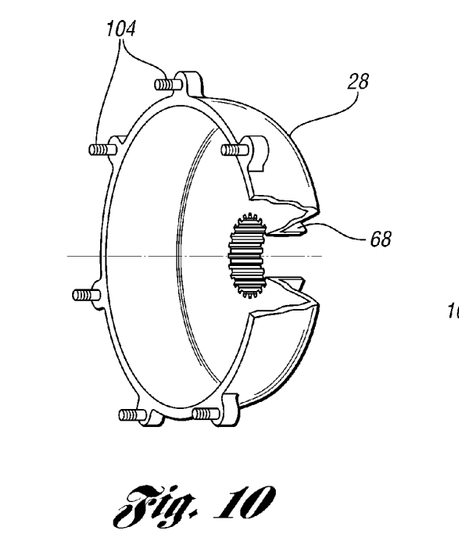
FIG. 10 is a perspective view of a drive shell.

FIG. 10 illustrates a perspective view of a drive shell 28. The drive shell is an annular member having an outer peripheral structure sufficiently large to freely surround the torque converter. The forward edge of the drive shell 28 is provided with a series of spaced apart fasteners 104 for cooperation with the mounting plate 32. The rearward end of the drive shell forms a tubular output 68 which preferably has a splined internal diameter for engaging a corresponding spline on the disconnect clutch input hub 34. The spaced apart fasteners 104 illustrated are a series of weld studs, however weld nuts could also be used to cooperate with bolts passed through corresponding apertures in the mounting plate.

Figure 11:
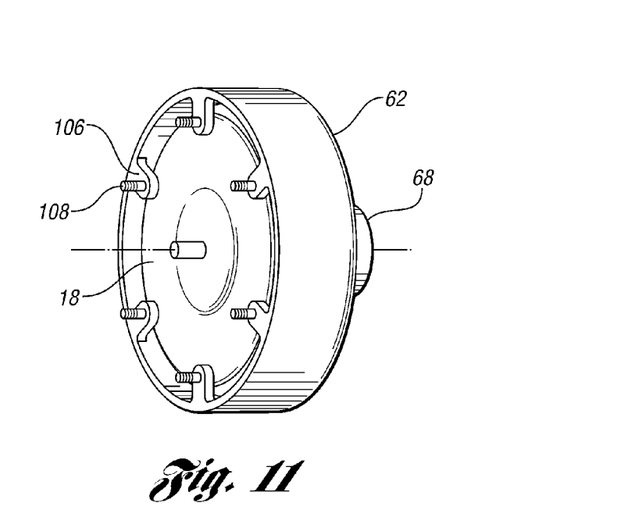
FIG. 11 is a view of an alternative embodiment of the drive shell with a torque inverter entrapped therein.

FIG. 11 illustrates an alternative drive shell embodiment 62 as previously illustrated in FIG. 5. In order to accommodate a small diameter mounting plate and a relatively large torque converter, the drive shell is provided with a series of inwardly projecting radial members 106 supporting fasteners The illustrated fasteners are provided by studs 108 located at the diameter of the array of holes in the mounting plate which is significantly less than the diameter of the torque converter. As a result, the inwardly projecting members 106 entrap the torque converter 18 inside the large annular cavity formed within the drive shell 62 creating the illustrated drive shell torque converter sub assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An assembly comprising:
   a housing enclosing a disconnect clutch, a motor and a gear train; and
   a drive shell surrounding a torque converter, the drive shell including an input attached to an engine, a tubular output connected to a disconnect clutch input, the disconnect clutch and the motor located between the torque converter and gear train.

2. The assembly of claim 1 wherein the torque converter is provided with a tubular input shaft, a stator mounted on a stator shaft attached to the housing, and a turbine mounted on an input shaft of the gear train.

3. The assembly of claim 2 wherein the input shaft of the gear train, the stator shaft, and tubular input shaft of the torque converter are nested coaxially within the drive shell tubular output.

4. The assembly of claim 2 wherein the motor drives a transmission fluid pump within the housing.

5. The assembly of claim 4 wherein the disconnect clutch is cooled by transmission fluid.

6. The assembly of claim 5 wherein a rotor portion of the motor is cooled by the transmission fluid.

7. The assembly of claim 6 wherein a stator portion of the motor is cooled by transmission fluid discharged from the rotor.

8. The assembly of claim 1 further comprising:
   a mounting plate interposed between the engine and the drive shell provided with an axially mounted first bearing member which cooperates with a second bearing member on the torque converter to provide radial support and to limit forward movement of the torque converter.

9. The assembly of claim 8 wherein the first bearing member comprises a roller bearing assembly and the second bearing member is formed by a stub shaft.

10. The assembly of claim 8 wherein the torque converter includes a thrust bearing which is axially oriented to engage a free end of a gear train input shaft to limit rearward movement of the torque converter.

11. The assembly of claim 1 further comprising:
    a mounting plate interposed between and attachable to a rotary output of the engine and to the drive shell to define an annular cavity surrounding the torque converter, wherein the drive shell further comprises a plurality of spaced apart fasteners for attachment to the mounting plate and a splined connector on the tubular output for engaging the disconnect clutch input.

12. The assembly of claim 11 wherein each of the spaced apart fasteners comprise an inwardly radially projecting member and a threaded fastener, wherein the torque converter is physically trapped in the drive shell.

13. The assembly of claim 1 wherein the gear train comprises:
    a main housing which partially defines an enclosed wet cavity, and
    a torque converter housing which is adapted to be affixed to the main housing and to a block of the engine, the torque converter housing having a rear wall which forms a boundary between the wet cavity and a dry cavity in which the torque converter is located, the rear wall defining an annular bore supported on a hub of the disconnect clutch input.

14. The assembly of claim 13 further comprising:
    a disconnect clutch input hub bearing interposed between the annular bore in the rear wall and the disconnect clutch input hub to transmit radial loads there between; and
    a rotor bearing interposed between the disconnect clutch input hub and a rotor shaft to radially support the rotor.

15. A hybrid vehicle comprising:
    an engine, a disconnect clutch, a motor, a torque converter and a transmission; and
    a drive shell interposed between the engine and the disconnect clutch partially enclosing the torque converter, the disconnect clutch and the motor located within the transmission;
    wherein the transmission further comprises a transmission housing which includes;
    a wet housing which partially defines an enclosed wet cavity, and
    a torque converter housing which is adapted to be affixed to the wet housing and to a block of the engine, the torque converter housing having a rear wall which forms a boundary between the wet cavity and a dry cavity in which the drive shell and the torque converter are located, the rear wall defining an annular bore which cooperates with a disconnect clutch input hub which supports a rotor shaft and an associated rotor portion of the motor.

16. The hybrid vehicle of claim 15 further comprising:
a mounting plate interposed between the engine and the drive shell provided with an axially mounted first bearing member which cooperates with a second bearing member on the torque converter to limit forward movement of the torque converter.

17. The hybrid vehicle of claim 16 wherein the torque converter includes a thrust bearing which is axially oriented to engage a transmission input shaft to limit rearward movement of the torque converter.

18. The hybrid vehicle of claim 15 further comprising:
a mounting plate interposed between and attachable to a rotary output of the engine and the drive shell to define an annular cavity surrounding the torque converter, wherein the drive shell further comprises a plurality of spaced apart fasteners to attach to the mounting plate and a splined connector forming an output for engaging a disconnect clutch input hub.

19. The hybrid vehicle of claim 15 further comprising:
a disconnect clutch input hub bearing interposed between the annular bore in the rear wall and the disconnect clutch input hub; and
a rotor shaft bearing interposed between the disconnect clutch input hub and the rotor shaft.

\* \* \* \* \*